(12) United States Patent
Du

(10) Patent No.: US 8,950,423 B2
(45) Date of Patent: Feb. 10, 2015

(54) DOUBLE-SEAT VALVE DEVICE

(75) Inventor: Tai Luong Du, Aalen (DE)

(73) Assignee: NEUMO Armaturenfabrik-Apparatebau-Metallgiesserei GmbH + Co. KG, Knittlingen (DE)

(*) Notice: Subject to any disclaimer, the term of this patent is extended or adjusted under 35 U.S.C. 154(b) by 200 days.

(21) Appl. No.: 13/524,244

(22) Filed: Jun. 15, 2012

(65) Prior Publication Data

US 2012/0318388 A1 Dec. 20, 2012

Related U.S. Application Data

(60) Provisional application No. 61/498,207, filed on Jun. 17, 2011.

(30) Foreign Application Priority Data

Jun. 17, 2011 (DE) .......................... 10 2011 077 717

(51) Int. Cl.
*F16K 1/44* (2006.01)
*F16K 11/20* (2006.01)

(52) U.S. Cl.
USPC ..................................... 137/312; 137/614.18

(58) Field of Classification Search
USPC .................................... 137/240, 312, 614.18
See application file for complete search history.

(56) References Cited

U.S. PATENT DOCUMENTS

| 4,617,955 | A | * | 10/1986 | Melgaard | ....................... 137/240 |
| 5,904,173 | A | * | 5/1999 | Ozawa | .......................... 137/240 |
| 6,349,742 | B1 | | 2/2002 | Borg et al. | |
| 6,676,047 | B1 | * | 1/2004 | Jensen et al. | ............. 137/614.18 |
| 7,845,368 | B2 | * | 12/2010 | Burmester et al. | ........ 137/614.18 |

FOREIGN PATENT DOCUMENTS

| DE | 10 2006 046 442 A1 | 3/2008 |
| EP | 0 819 876 A2 | 1/1998 |
| WO | WO 98/54494 A1 | 12/1998 |
| WO | WO 2007/054131 A1 | 5/2007 |

OTHER PUBLICATIONS

German Examination Report dated Apr. 18, 2012 (Six (6) pages).

\* cited by examiner

*Primary Examiner* — Kevin Lee
(74) *Attorney, Agent, or Firm* — Crowell & Moring LLP

(57) ABSTRACT

A double-seat valve device, with a valve seat region, includes a first circular cylindrical-shaped seat surface with a first diameter, which with a first sealing element forms a radial seal for a connection opening to a first housing part, and a second circular cylindrical-shaped seat surface with a second diameter smaller than the first, which with a second sealing element forms a radial seal for the opening to a second housing part. A third seat surface is arranged between the first and second surfaces. In a closed position of the first closing member, the contact region rests against the third seat surface, to form a solid-state stop for the contact region. A deflecting surface is arranged between the first and third seat surfaces. The deflecting surface has an outlet edge offset to the third seat surface. A direction vector at the outlet edge points away from the second sealing element.

17 Claims, 7 Drawing Sheets

DOUBLE-SEAT VALVE DEVICE

CROSS-REFERENCE TO RELATED APPLICATIONS

This application claims the benefit of U.S. Provisional Application Ser. No. 61/498,207, filed Jun. 17, 2011 and German Application No. DE 10 2011 077 717.2, filed Jun. 17, 2011, under 35 U.S.C. §119.

FIELD

The application relates to a double-seat valve device.

Double-seat valve devices are used for example, in beverage and brewing industry equipment, in the food and dairy industry, the pharmaceutical industry and/or in the cosmetics industry. The purpose of the double-seat valve device is to separate incompatible products reliably.

BACKGROUND

Known double-seat valve devices comprise a first closing member with a first sealing element, a second closing member movable relative to the first closing member and having a second sealing element, and a valve housing with a first housing part and a second housing part and with a connection opening for communicating the first housing part with the second housing part. The closing members can be moved separately to allow single seat-lift separation while product is in the opposite housing, in particular for cleaning of the associated valve seats.

SUMMARY

It is the object of the present application to provide a double-seat valve device with a high processing reliability.

This object is achieved by a double-seat valve device comprising a first closing member with a first sealing element and a contact region, a second closing member movable relative to the first closing member and having a second sealing element, and a valve housing with a first housing part and a second housing part and with a connection opening communicating the first housing part with the second housing part, wherein an inner surface of the connection opening is provided with a valve seat region, comprising a first circular cylindrical-shaped seat surface with a first diameter, which together with the first sealing element forms a radial seal for closing of the connection opening to the first housing part, a second circular cylindrical-shaped seat surface with a second diameter, which together with the second sealing element forms a radial seal for closing of the connection opening to the second housing part, wherein the second diameter is smaller than the first diameter, a third seat surface which is arranged between the first seat surface and the second seat surface, wherein in a closed position of the first closing member the contact region of the first closing member rests against the third seat surface, so that the seat surface forms a solid-state stop for the contact region, and a deflecting surface, wherein the deflecting surface is arranged between the first seat surface and the third seat surface, the deflecting surface has an outlet edge which is offset to the third seat surface, and a direction vector at the outlet edge of the deflecting surface points in a direction away from the second sealing element.

A device for blocking or for controlling the flow of fluids, that is, gases and/or liquids, between two pipelines or housing parts, is referred to as a valve. The double-seat valve device comprises at least two valves, each with a sealing element and an associated seat surface, for blocking or controlling the flow of fluids between the first and the second housing part. The closing members with the sealing elements and the associated seat surfaces each form a radial seal. In connection with this application, a seal which makes a seal between a first component arranged radially inside the sealing plane, and a second component arranged radially outside of the sealing plane, is referred to as a radial seal. A seal in which the sealing surfaces are normal to the axis of the seal is referred to as a face seal or axial seal. An inner seat surface having a circular cross-section is referred to as circular cylindrical-shaped seat surface.

The first closing member and the housing both are rigid bodies that contact each other in the closed position. A rigid body in the context of the application is defined as a body the deformation of which is neglectable regardless of the forces exerted. The contact between two rigid bodies is referred to as solid-state contact. In a closed position the contact region and the third seat surface are in solid-state contact. A closing effect is obtained in the closed position of the first closing member due to the effect of a constraining force. In one embodiment, the constraining force is applied by a gravity force of the closing member. Alternatively or additionally, force elements are provided, for example, comprising magnets or restoring springs; which force the closing member into the closed position. The valve housing and the closing members in several embodiments are each made of stainless steel, so that the solid-state contact is a metal-to-metal contact. The sealing elements mounted to the closing members in one embodiment are designed as O-rings, which are installed in associated grooves of the closing members. The sealing elements are each in sliding contact with the seat surfaces in order to effect a seal in the closed position. Any wear on the sealing elements may reduce a sealing effect of the sealing elements. Due to the additional sealing effect by means of the solid-state contact, it is ensured that in this case as well, the products supplied in the first housing part and in the second housing part are reliably separated from each other. This also permits a cleaning and/or a sterilization during the production ("cleaning in place"—CIP, or "sterilization in place"—SIP), that is, without disassembly and even while at least one product is present in one housing part.

An opening of one valve is known as "seat-lifting", short "lifting", "venting" or "cycling." Due to the solid-state contact, even when lifting the second closing member it is ensured that a sterilization and/or cleaning fluid used for rinsing of the second housing part and the second closing member does not come into contact with a product present in the first housing part.

In connection with this application a section of the valve seat region used to divert or deflect a fluid jet, in particular a jet of a sterilization- and/or cleaning fluid, also known as a steam jet, is called the deflecting surface. The deflecting surface is also referred to as the jet guide surface. The deflecting surface is provided with an outlet edge arranged offset to the third seat surface. In the context of the application, an offset arrangement of the outlet edge denotes a transition region in which a direction vector at the outlet edge does not coincide with a direction vector at the inlet edge of an adjoining surface, for example due to a discontinuity. Furthermore, an incline of the deflecting surface is selected such that a direction vector at the outlet edge of the deflecting surface points in a direction away from the second sealing element. The deflecting surface is in other words configured so as to avoid a direct impact of the fluid on the second sealing element and on the third seat surface. Direct impact of the fluid or of the fluid jet is referred to as a speed component of a fluid jet which is directed perpendicularly onto an element bounding a flow. A direct impact causes an impact force on the seal or the element bounding the flow, which results in a static pressure, also referred to as a stagnation pressure. Due to the static pressure, in the absence of a sealing element or in case of wear on the sealing element, a leakage flow may occur in case of direct impact. By means of the deflecting surface, a direct impact of the second sealing element and thus a leakage flow in the region of the second valve seat is prevented.

In other words, the deflecting surface between the first seat surface and the third seat surface is configured such that during lifting or cycling of the first closing member, a fluid jet arriving tangentially to the first seat surface is deflected by an angle of at least 90°. The deflected fluid jet features no velocity component which is directed perpendicularly onto the second sealing element bounding the flow. Thus, a direct impact of the radial seal and a resultant pressure increase on the radial seal are prevented. Preferably a leakage cavity is provided in the second closing member through which the deflected fluid jet can flow for discharge.

In one embodiment the deflecting surface is at least in one section concavely curved. In the context of the application a concavely curved section is defined as a bulge away from a center axis. Due to the concave curvature a reliable deflection of the fluid jet in the direction of the axis of the closing member is achieved. In one embodiment, the concave curved section has a configuration like that of a annular groove.

Another embodiment provides that the curvature of the deflecting surface has an inflection point and/or a point of discontinuity in a transition section to the third seat surface. In the context of the application, an inflection point denotes a location where the deflecting surface changes its curvature behavior, wherein in one embodiment, a convex curved section of the deflecting surface transforms into a concave curved section. A discontinuity point denotes a location where jumps or steps occur. Due to an inflection point and/or a discontinuity point, the deflecting surface has an opening edge offset to the third seat surface, so that a flow along the deflecting surface does not lead to a direct impact of the third seat surface.

In another embodiment, the first closing member is provided with a contact region cooperating with the third seat surface and with a circular cylindrical-shaped outside surface, wherein the diameter of the contact region is greater than the diameter of the second seat surface. The corresponding third surface in one embodiment has a tapered structure. In this embodiment, the contact region together with the third seat surface forms a semi-axial seal. Due to the diameter relationships, a safety in case of a pressure shock of the first closing member against a movement of the first closing member towards the second housing part is assured, independently of the level of a pressure shock.

In an alternative embodiment, the contact region of the first closing member is arranged at a front surface. In this embodiment, the contact region with the third seat surface forms an axial seal or face seal. For this purpose, the third seat surface in several embodiments is arranged, at least in sections, perpendicularly to the axial direction of the first closing members.

In one embodiment, the first closing member is provided with a conical section adjoining to the front surface. The conical section functions as a diffuser for the fluid jet. In addition, a guidance of the closing member moving towards the closing position is facilitated by means of the conical section. In case of a contact region with a circular cylindrical-shaped outside surface, the contact region is provided in one embodiment the conical section.

In another refinement, the first closing member is provided with an accommodation section having a circular cylindrical-shaped outer surface and a throttle section arranged between the accommodating section and a front surface facing the second closing member, said throttle section having a circular cylindrical-shaped outer surface, wherein the first sealing element is mounted at the accommodating section, and a diameter of the throttle section is larger than a diameter of the accommodating section. During a seat-lifting of the first closing member, in preferred embodiments, the first closing member is moved only by a short distance. Thus, the throttle section remains in the region of the connection opening. Due to the throttle section a jet of a cleaning fluid, in particular a jet of steam, is throttled, so that a pressure of the cleaning fluid downstream of the throttle section acting on the second sealing element is reduced.

In an additional embodiment, the second closing member is provided with an end section having an outer surface against at which the second sealing element is mounted. Preferably, on a front surface facing the second closing member, the first closing member is provided with a recess complementary to the end section of the second closing member, wherein the end section is insertable into the recess, so that this recess in any rotary position forms a sealing line with the outer surface of the end section. When opening the valve device, that is, when moving both closing members into an open position, the closing members are moved preferably to abut each other. For this purpose, in one embodiment the end section of the second closing member is inserted into the recess of the first closing member. Thus, a reliable contact between the closing members is ensured.

In an additional embodiment, the second closing member is provided with a leakage cavity having a conical inlet opening facing the first closing member. The inlet opening extends in one embodiment up to the outer surface of the second closing member. Hence, a stagnation point of an arriving fluid jet in the front region of the second closing member is avoided.

In several embodiments, the closing members are arranged for an independent movement for a seat-lifting—also referred to as cycling or venting. For a seat-lifting, one of the sealing elements is separated from its associated seat surface, whereas the other sealing element remains seated tightly against its associated seat surface. During the seat-lifting, a cleaning- or sterilization fluid can be supplied via the opened valve seat, which cleaning- or sterilization fluid is discharged in one embodiment via the leakage cavity. Upon opening of the valve device, the closing members rest against each other, so that the leakage cavity is separated from the products.

In further embodiments, the double-seat valve device is provided with a pneumatic valve drive. The pneumatic valve drive comprises in several embodiments a pneumatic cylinder, a first and a second piston seated so as to be displaced in the pneumatic cylinder, an outer shaft which connects the first closing member to the first piston for a transfer of movement, and an inner shaft arranged concentrically to the outer shaft, which connects the second closing member to the second piston for a transfer of movement. Due to the embodiment with outer and inner shaft, driving both closing members is possible from one side of the housing.

Preferably, the pneumatic cylinder is divided by the pistons into a first, a second and a third pressure chamber, wherein upon pressurizing of the first pressure chamber, both closing members can be moved jointly into an open position, upon pressuring of the second pressure chamber, the first closing member is lifted and upon pressurizing of the third pressure chamber, the second closing member is lifted.

In an additional embodiment, a traverse is provided by means of which the inner shaft is connected to the second closing member for a transfer of movement. The traverse is defined as a component comprising one or a plurality of webs extending in a radial direction, wherein free space remains between the webs. The traverse in one embodiment is provided with two webs arranged at a 180° offset. By means of the two webs, a control with sufficient stability is ensured. At the same time, ample free space is created between the webs through which a cleaning fluid is discharged.

In one embodiment the traverse is arranged on one end of the second closing member facing away from the first closing member. In another embodiment, a distance between the traverse and one end of the second closing member facing, the first closing member is smaller than a distance between the traverse and one end of the second closing member facing away from the first closing member. Thus, the movement of the second closing member connected to the shaft via the traverse is controlled in the region of the end associated with the valve seat region. This permits a stable control of the movement of the second closing member.

Other embodiments are defined in the dependent claims. Further advantages of the disclosure emerge from the claims and from the following description of exemplary embodiments of the disclosure, which are schematically illustrated in the drawings. Uniform reference signs are used in the drawings for equivalent or similar components. Features described or illustrated as part of one exemplary embodiment can likewise be used in another exemplary embodiment in order to obtain a further embodiment of the disclosure.

DETAILED DESCRIPTION OF THE DRAWINGS

Figure 1:
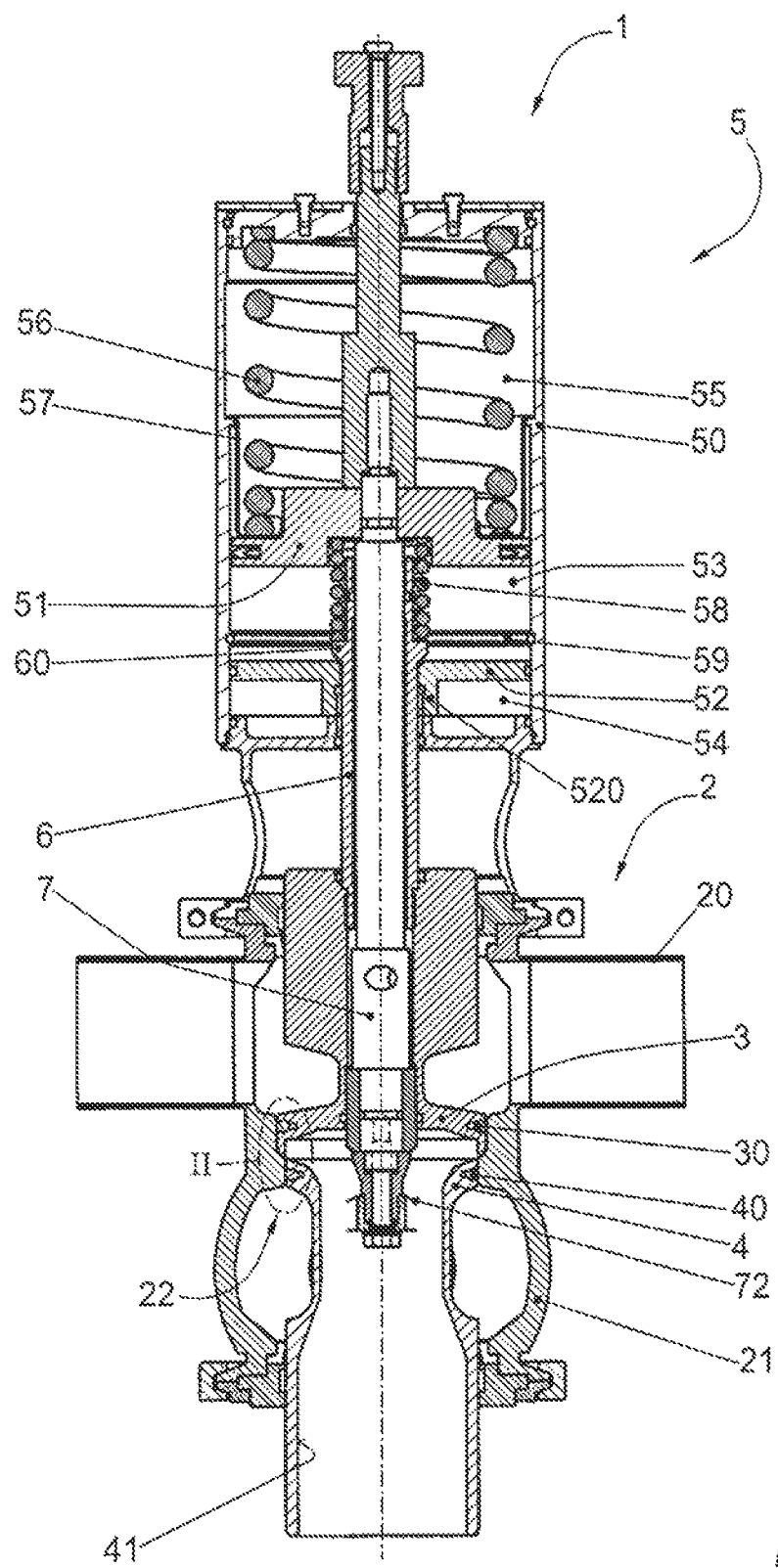
FIG. 1 schematically shows a first embodiment of a double-seat valve device 1 shown in cross section.

FIG. 1 shows cross-sectional view of a first exemplary embodiment of a double-seat valve device 1. The double-seat valve device 1 comprises a valve housing 2 and being displaceably mounted therein are a first closing member 3 with a first sealing element 30, and a second closing member 4 with a second sealing element 40, which can move relative to the first closing member 3. The valve housing 2 is designed with a first housing part 20 and a second housing part 21 and with a connection opening 22 communicating the first housing part 20 with the second housing part 21.

In one application, the first housing part 20 is connected to a product tank (not illustrated) and the second housing part 21 is connected to a product line (likewise not illustrated).

A pneumatic valve drive 5 is provided for a joint or for a separate movement of the closing members 3, 4. The pneumatic valve drive 5 comprises a cylinder 50, in which two working pistons 51, 52 are displaceably mounted. The working pistons 51, 52 are connected by valve shafts 6, 7 to the closing members 3, 4 for a transfer of movement. In the illustrated embodiment, an outer shaft 6 and an inner shaft 7 are provided as valve shafts 6, 7. The outer shaft 6 is connected to the first closing member 3 for a transfer of movement. The outer shaft 6 is a hollow shaft, wherein inside the outer shaft 6 the inner shaft 7 is moveably arranged, which inner shaft 7 is connected to the second closing member 4 for a transfer of movement.

For connecting the inner shaft 7 to the closing member 4, in the illustrated exemplary embodiment a traverse 72 is provided with two webs arranged at a 180° offset, wherein the webs of the traverse 72 are merely indicated in the illustrated cross sectional view. A distance between the traverse 72 and one end of the second closing member 4 facing the first closing member 3, is less than a distance between the traverse 72 and another end of the second closing member 4 facing away from the first closing member 3. In the illustrated embodiment, the distance between the traverse 72 and the end of the second closing member 4 facing the first closing member 3, amounts to between about 15 mm and about 25 mm.

The cylinder 50 is divided into three pressure chambers 53, 54, 55 by means of the two working pistons 51, 52. A compressed air supply (not illustrated in FIG. 1) is provided at each of the pressure chambers 53, 54, 55 for supplying compressed air to each chamber individually.

A first restoring spring 56 is arranged in the third pressure chamber 55. The first restoring spring 56 is supported by a counter support 57, which counter support 57 is arranged moveable in the third pressure chamber 55. In the first pressure chamber 53 there is a second restoring spring 58, which is braced against the working piston 51 and against an annular collar 60 provided on the outer shaft 6. The restoring springs 56, 58 are each designed as compression springs. The second restoring spring 58 is designed with smaller dimensions than the first restoring spring 56, that is, a restoring force applied by the first restoring spring 56 in the case of an equal displacement, is greater than a restoring force applied by the second restoring spring 58. Due to the counter support 57, the first restoring spring 56 is disengaged during a movement of the first working piston 51 from the illustrated rest-position in the direction of the first pressure chamber 53. That is, during a movement of the first working piston 51 from the illustrated rest-position in the direction towards the first pressure chamber 53, a force applied by the first restoring spring 56 is prevented from acting on the working piston 51. A movement of the working piston 51 from the illustrated rest-position in the direction towards the third pressure chamber 55, however, does occur against the force of the first restoring spring 56. Upon this movement of the working piston 51, the counter support 57 is displaced by the first working piston 51. The first working piston 51 is thus held in an equilibrium position due to the two restoring springs 56, 58. The second working piston 52 is provided with a stop 520 which prevents a displacement of the working piston 52 from the rest-position illustrated in FIG. 1 for a reduction in the volume of the second pressure chamber 54. Any movement of the second working piston 52 in the direction of the first pressure chamber 53 takes place against the force of the second restoring spring 58. In addition, in the first pressure chamber 53 there is a retaining ring 59, which limits the movement of the second working piston 52 in the direction of the first pressure chamber 53.

In the illustrated exemplary embodiment, the inner shaft 7 connected to the second closing member 4 is translatory fixed to the first working piston 51, which is located between the first pressure chamber 53 and the third pressure chamber 55. Thus any axial movement of the first working piston 51 directly also causes an axial movement of the second closing member 4.

The outer shaft 6 connected to the first closing member 3 is connected to the second working piston 52 via the annular collar 60 such that a displacement of the working piston 52 in the direction of the first pressure chamber 53 is transferred to the outer shaft 6. However, in the illustrated usual orientation of the double-seat valve device 1, an upward movement of the outer shaft 6 caused by an upward movement of the second closing member 4 is not trans-ferred to the working piston 52. Thus it is possible to limit a movement of the outer shaft 6 caused by the second working piston 52 by means of the retaining ring 59 which acts as a stop for the working piston. However, the outer shaft 6 is moveable beyond the positioning limited by the retaining ring by means of other mechanisms for opening of the closing member 3.

The closing member 4 is provided with a leakage opening 41 through which a leakage flow moving through the sealing elements 30, 40 can be drained in the event of a defect.

Figure 2:
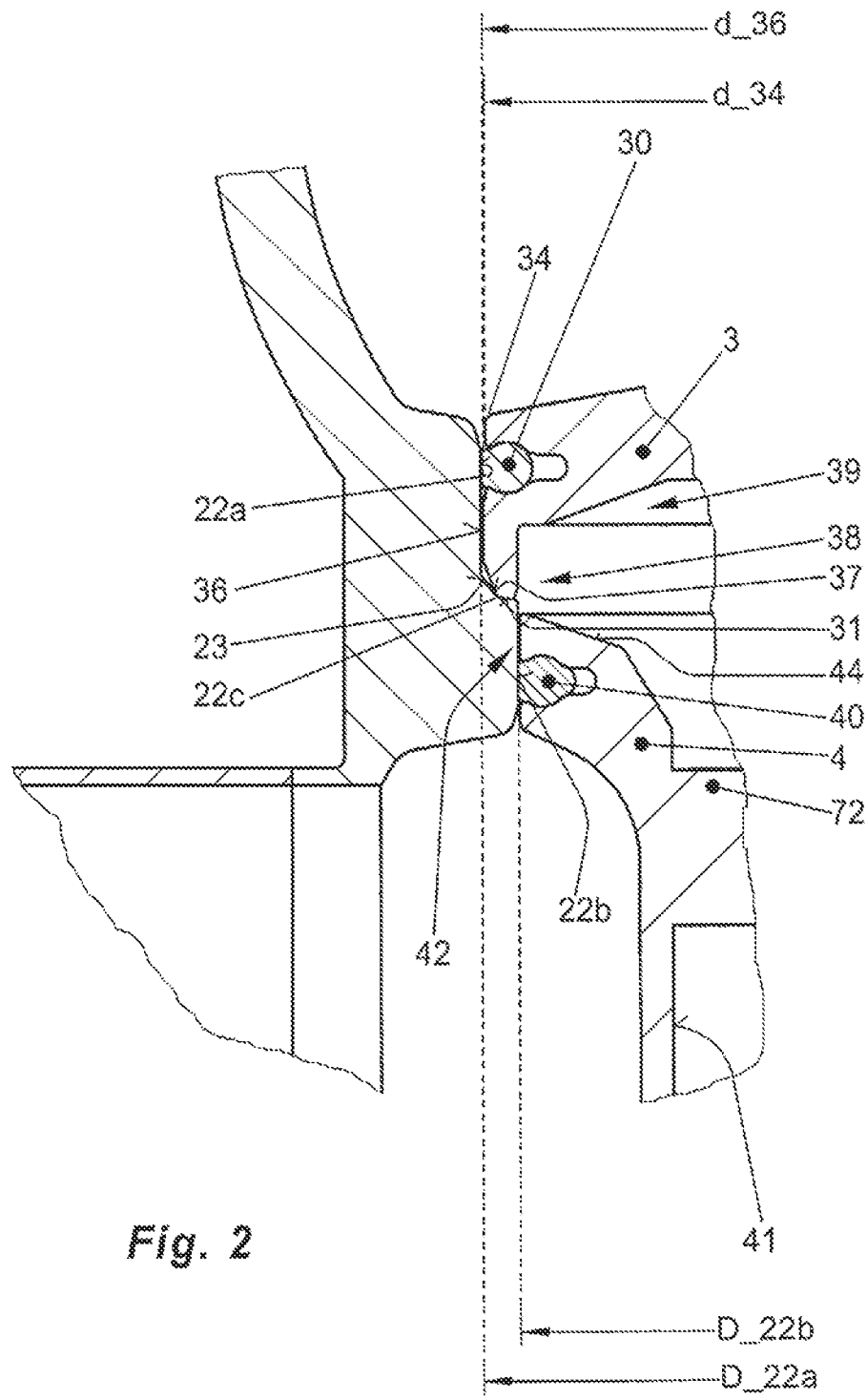
FIG. 2 schematically shows a detail II pursuant to FIG. 1 in a closed position of the double-seat valve device.

FIG. 2 shows a detail II according to FIG. 1 in a view rotated with respect to FIG. 1, wherein the two closing members 3, 4 are located in a closed position as in FIG. 1. This state is also referred to as the closed position of the double-seat valve device 1. As shown in FIG. 2, at an inner surface of the connection opening 22 there is a valve seat region with a first seat surface 22a, a second seat surface 22b and a third seat surface 22c. The first seat surface 22a is circular cylindrical shaped with a first diameter $D\_22a$. The first sealing element 30 cooperates with the first seat surface 22a, as shown, for closing of the connection opening 22 to the first housing part 20 (see FIG. 1). The second seat surface 22b is likewise circular cylindrical shaped with a second diameter $D\_22b$, wherein the second diameter $D\_22b$ of the second seat surface 22b is smaller than the diameter $D\_22a$ of the first seat surface 22a. The second seat surface 22b cooperates with the second sealing element 40 for closing of the connection opening 22 to the second housing part 22 (see FIG. 1). The sealing elements 30, 40 each are in a sliding contact with the seat surfaces 22a, 22b. The sealing elements 30, 40 in the illustrated, closed position, thus form a radial seal with the seat surfaces 22a, 22b.

Furthermore, a third seat surface 22c is provided which is arranged between the first seat surface 22a and the second seat surface 22b. The first closing member 3 is provided with a contact region 31 at a front surface which rests against the third seat surface 22c in the illustrated, closed position of the first closing member 3. Thus the closing member 3 forms an axial seal or face seal with the third seat surface 22c. A constraining force is applied via the restoring spring 58 (cf. FIG. 1) engaged with the annular collar 60 and the gravity of the first closing member 3. Said constraining force forces the contact region 31 against the seat surface 22c, without additional supply of compressed air to the contact chambers 53, 54, 55, so that a sealing effect is achieved owing to the solid-state contact between closing member 3 and seat surface 22c.

A concavely curved deflecting surface 23 is formed between the first seat surface 22a and the third seat surface 22c. The concavely curved deflecting surface 23 does not transform continuously into the third seat surface 22c. Rather, a step is provided between the deflecting surface 23 and the third seat surface 22c, so that a fluid flowing along the deflecting surface 23 is not directed in the direction of the third seat surface 22c. Thus, the deflecting surface 23 has an outlet edge, which is offset to the third seat surface 22c.

A direction vector at the outlet edge of the deflecting surface 23 points normal to the second seat surface 22b and thus in the direction away from the second sealing element 40.

By means of the illustrated double-seat valve device 1a cleaning and/or a sterilization is possible during the production ("cleaning in place" or "cleaning in process"—CIP or "sterilization in place/process"—SIP), that is, while a product is present in at least one housing part 20, 21.

With the valve closed (cf. FIGS. 1 and 2) for this purpose a cleaning- and/or sterilization fluid is removed through the leakage opening 41 and free spaces of the traverse 72. An opening region 44 of the leakage opening 41 at the end of the second closing member 4 facing the first closing member 3 in the illustrated exemplary embodiment directly adjoins to the outer surface of the end region 42, so that a planar front surface at the end is minimized or—as illustrated—is prevented. The opening region 44 in the illustrated embodiment proceeds discontinuously with a kink.

The first closing member 3 is provided with an accommodation section 34 having a circular cylindrical shaped outer surface at which the first sealing element 30 is mounted. In addition, at the front surface between the accommodation section 34 and the contact region 31 there is a throttle section 36 with a circular cylindrical shaped outer surface and a conical end region 37. A diameter $d\_36$ of the throttle section 36 is larger than a diameter of the accommodation section $d\_34$.

The second closing member 4 likewise is provided at its end section 42 with a circular cylindrical shaped outer surface at which the second sealing element 40 is mounted. On its front surface facing the second closing member 4 the closing member 3 is provided with a recess 38 complementary to the end section 42 of the second closing member 4, so that the second closing member 4 is insertable into the recess 38. A second recess 39 of smaller cross section adjoins the recess 38.

As is evident in FIG. 1, the closing members 3; 4 are configured as so called "balancers", wherein in the region of a passage through the first housing part 20 and/or the second housing part 21, respectively, the first closing member 3 and the second closing member 4 are each equipped with a diameter which is essentially equal to the diameter $D\_22a$ of the first seat surface 22a or diameter $D\_22b$ of the second seat surface 22b, respectively. Thus the risk of product contamination due to pressure surges or pressure shocks is further reduced.

The operation of the double-seat valve device 1 will be explained below with reference to FIGS. 1 to 5.

As shown in FIG. 1, due to a pressurization of the first pressure chamber 53 the working piston 51 is displaced against the force of the first restoring spring 56. The displacement occurs in the upward direction in the illustrated standard orientation. Due to the displacement of the working piston 51, the inner shaft 7 fixedly coupled to the working piston 51 and thus the closing member 4 are displaced in the direction of the first closing member 3.

Figure 3:
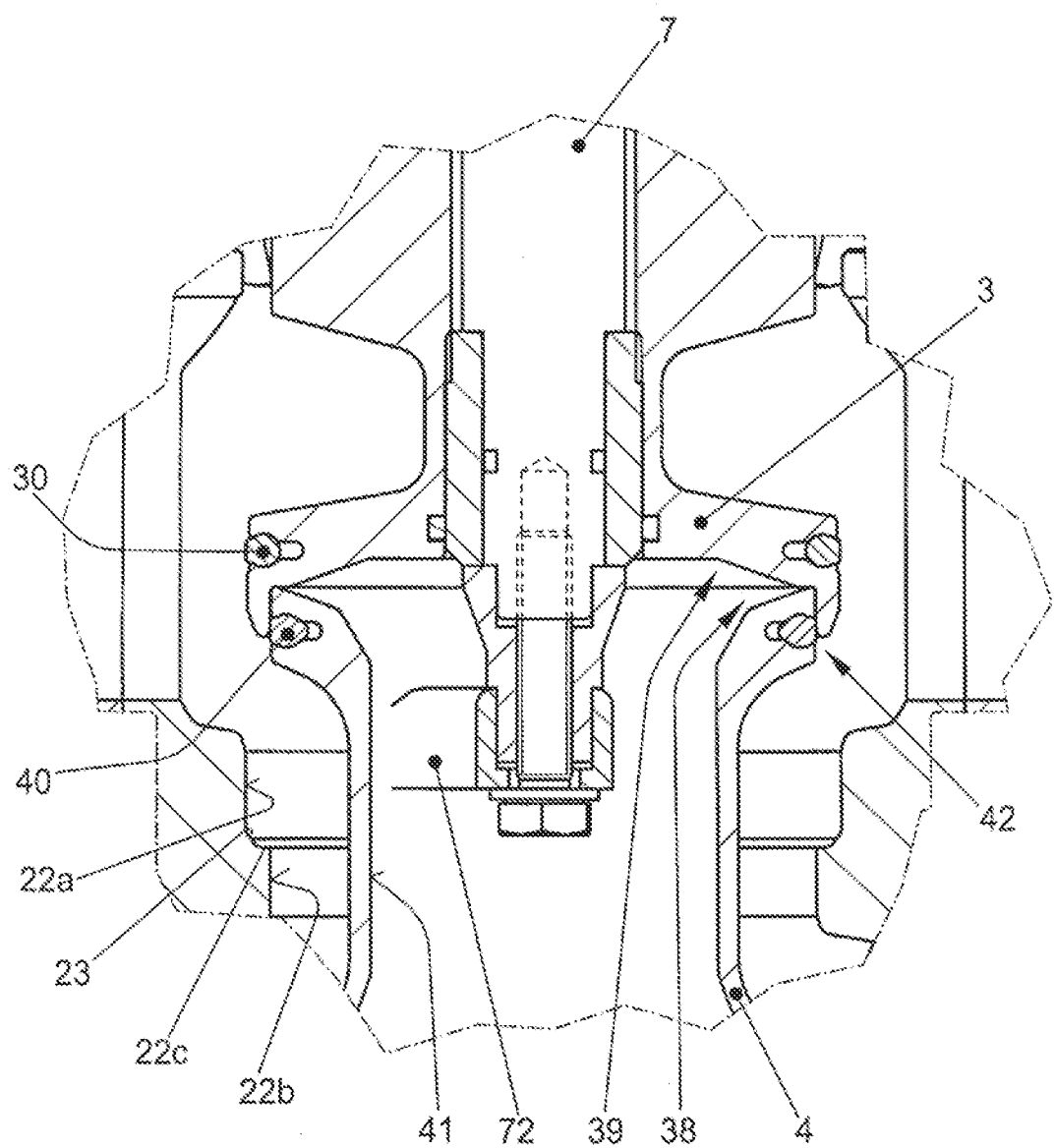
FIG. 3 schematically shows a detail of a double-seat valve device similar to FIG. 1, in an open position of the double-seat valve device.

As illustrated in FIG. 3, due to the displacement the mutually facing ends of the closing members 3, 4 abut each other. The end section 42 of the second closing member 4 is thereby inserted into the complementary recess 38 of the first closing member 3. Thus, the sealing element 40 forms a radial seal with the recess 38.

After the second closing member 4 is moved to abut the first closing member 3 by pressurization of the first pressure chamber 53 as described above, the movement of the second closing member 4 is transferred to the first closing member 3 and due to a further supply of compressed air into the first pressure chamber 53, the two closing members 3, 4 are moved together against the force of the first restoring spring 56, so that the valve device 1 is opened and products present in the housing parts 20 and 21 are brought into contact with each other. As is evident from FIG. 1, the force of the second restoring spring 58 arranged between the annular collar 60 of the outer shaft 6 and the first working piston 51 restrains a relative movement between the outer shaft 6 and the inner shaft 7, and thus the closing members 3, 4, which might otherwise result in a separation of closing members 3, 4. In other words, the second restoring spring 58 forces the first closing member 3 connected to the outer shaft 6 in the direction of the second closing member 4.

As is evident in FIG. 3, a cleaning is possible even with a valve in the open position. A sealing against the product is assured by the second sealing element 40 and a solid-state contact between the closing members 3, 4. A separation of the closing members 3, 4 is prevented, as described above. A cleaning fluid can be drained through the leakage opening 41.

As is evident from FIG. 1, when compressed air is supplied to the second pressure chamber 54, a movement occurs to allow seat-lifting of the first closing member 3. Due to the supply of compressed air, the second working piston 52 is moved upwards until it reaches a stop formed by the retaining ring 59. In the standard orientation of the double-seat valve device 1 as illustrated in the figure, the movement occurs in an upward direction. The second working piston 52 is connected to the outer shaft 6 via the annular collar 60 such that the movement of the working piston 52 is transferred to the outer shaft 6 for lifting the closing member 3. Owing to the movement of the outer shaft 6, the spring 58 arranged between the first working piston 51 and the outer shaft 6 in the first pressure chamber 53 is compressed. Thus, a force is exerted onto the first working piston 51 and thus also onto the inner shaft 7 fixedly connected to the first working piston 51. However, in the rest-position illustrated in FIG. 1, one end 61 of the outer shaft 6 is arranged at a distance to the first working piston 51. Thus, there is merely a transfer of force, but not a transfer of movement to the first working piston 51. A displacement movement of the working piston 51 due to the acting force applied by the second restoring spring 58 is prevented by the first restoring spring 56. The second closing member 4 is thus reliably held in a closed position.

Figure 4:
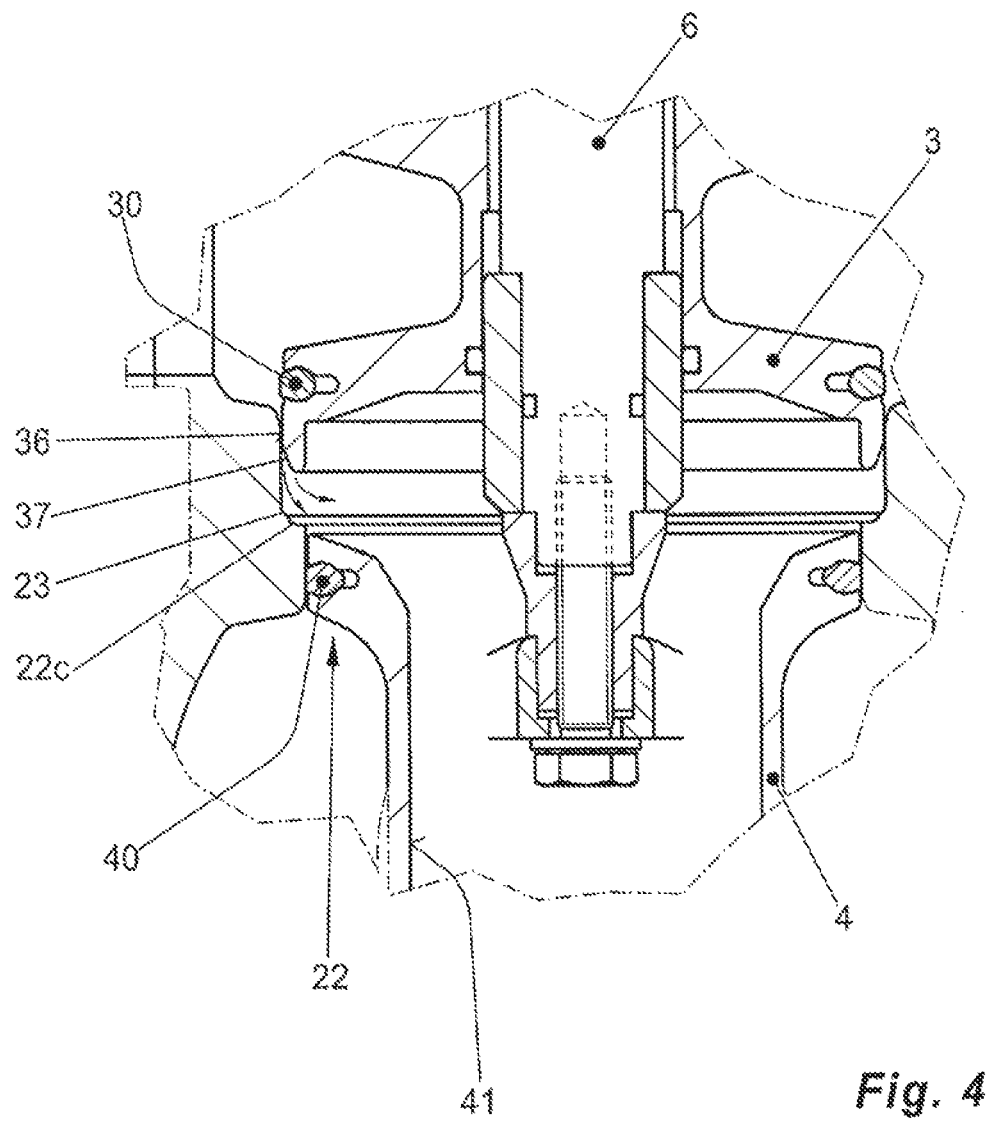
FIG. 4 schematically shows a detail of the double-seat valve device according to FIG. 3 when cycling the first closing member.

FIG. 4 shows schematically a detail of the double-seat valve device 1 according to FIG. 3, during lifting of the first closing member 3. As shown in FIG. 4, during lifting of the first closing member 3, the first closing member 3 is moved only for a short distance in the illustrated embodiment. The throttle section 36 remains in the region of the connection opening 22. The conically tapered end region 37 adjoining the throttle section 36 acts as a diffuser. A jet, in particular a jet of steam of a cleaning fluid, is throttled by the throttle section 36, so that a pressure of the cleaning fluid acting on the second sealing element 40 is reduced. An entering cleaning jet is additionally deflected by the deflecting surface 23, as indicated schematically by the arrows, in the direction of the leakage opening 41 and away from the second sealing element 40. Thus, the deflecting surface 23 prevents that a pressure is applied by the cleaning fluid onto the second sealing element 40. In several embodiments, the deflection additionally causes a suction effect on the second sealing element 40. The suction effect is also referred to as negative pressure. The cleaning fluid is drained through the leakage cavity 41.

As shown in FIG. 1, lifting of the second closing member 4 is achieved by supplying compressed air to the third pressure chamber 55. Due to the supply of compressed air, the working piston 51 is moved in such a manner that the inner shaft 7 fixedly connected to the first working piston 51 lifts the closing member 4. The movement occurs downward in the standard orientation of the valve device 1 illustrated in the figures. As described, the end 61 of the outer shaft 6 is arranged at a distance to the first working piston 51 in the rest-position illustrated in FIG. 1. A displacement of the first working piston 51 downward thus will not be transferred directly onto the outer shaft 6. A downward displacement of the outer shaft 6 is additionally prevented by means of the contact between the contact region 31 of the first closing member 3 and the seat surface 22c. Finally, a downward displacement of the outer shaft 6 is also prevented by the stop 520 at the second working piston 52. Due to the second restoring spring 58 provided between the first working piston 51 and the annular collar 60 of the outer shaft 6, the outer shaft a constraining force acting in a downward direction is applied on the outer shaft 6, and thus the first closing member 3 will be forced into the closed position.

Figure 5:
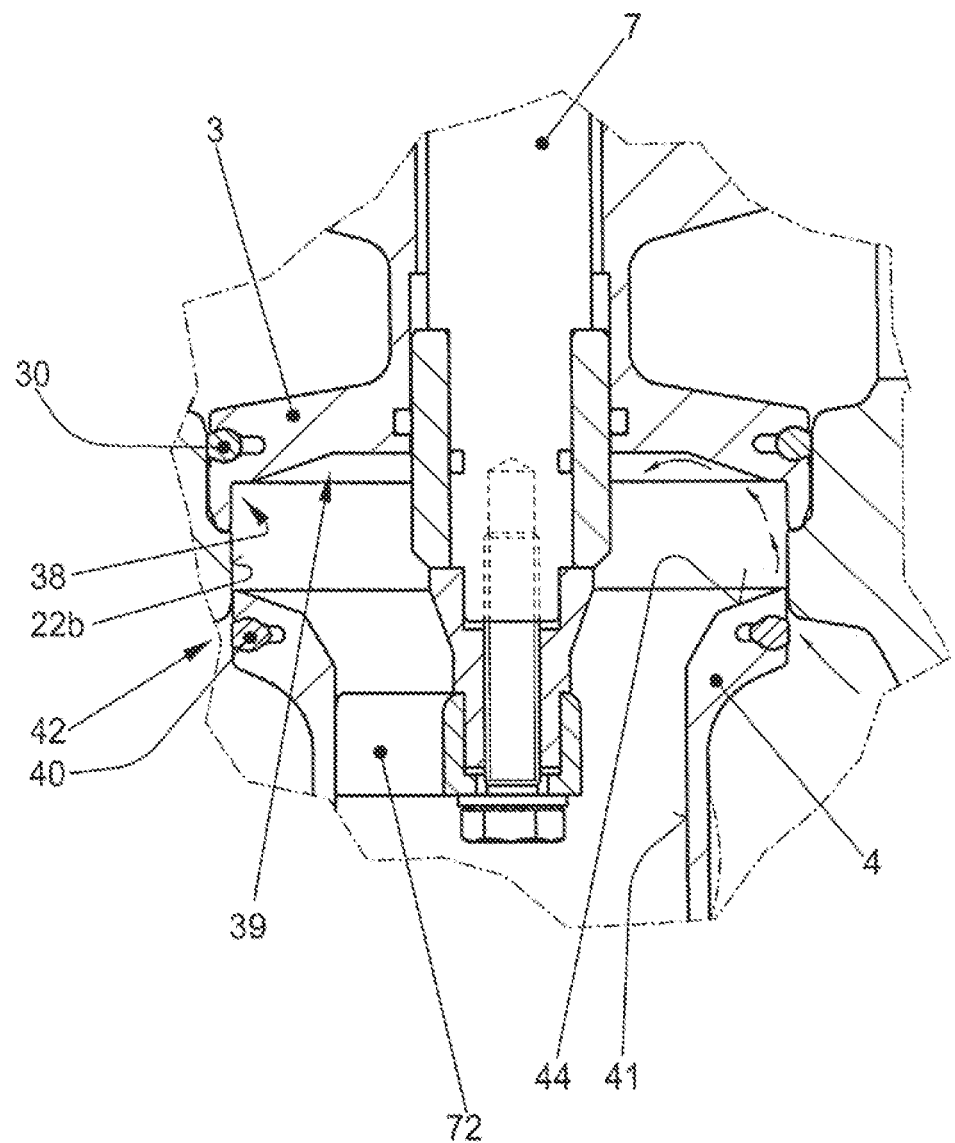
FIG. 5 schematically shows a detail of the double-seat valve device according to FIG. 3 when cycling the second closing member.

FIG. 5 shows schematically a detail of the double-seat valve device 1 according to FIG. 3 during seat-lifting of the second closing member 4. As is evident in FIG. 5, a reliable deflection of a cleaning jet—illustrated schematically by arrows—is achieved due to the second recess 29.

Figure 6:
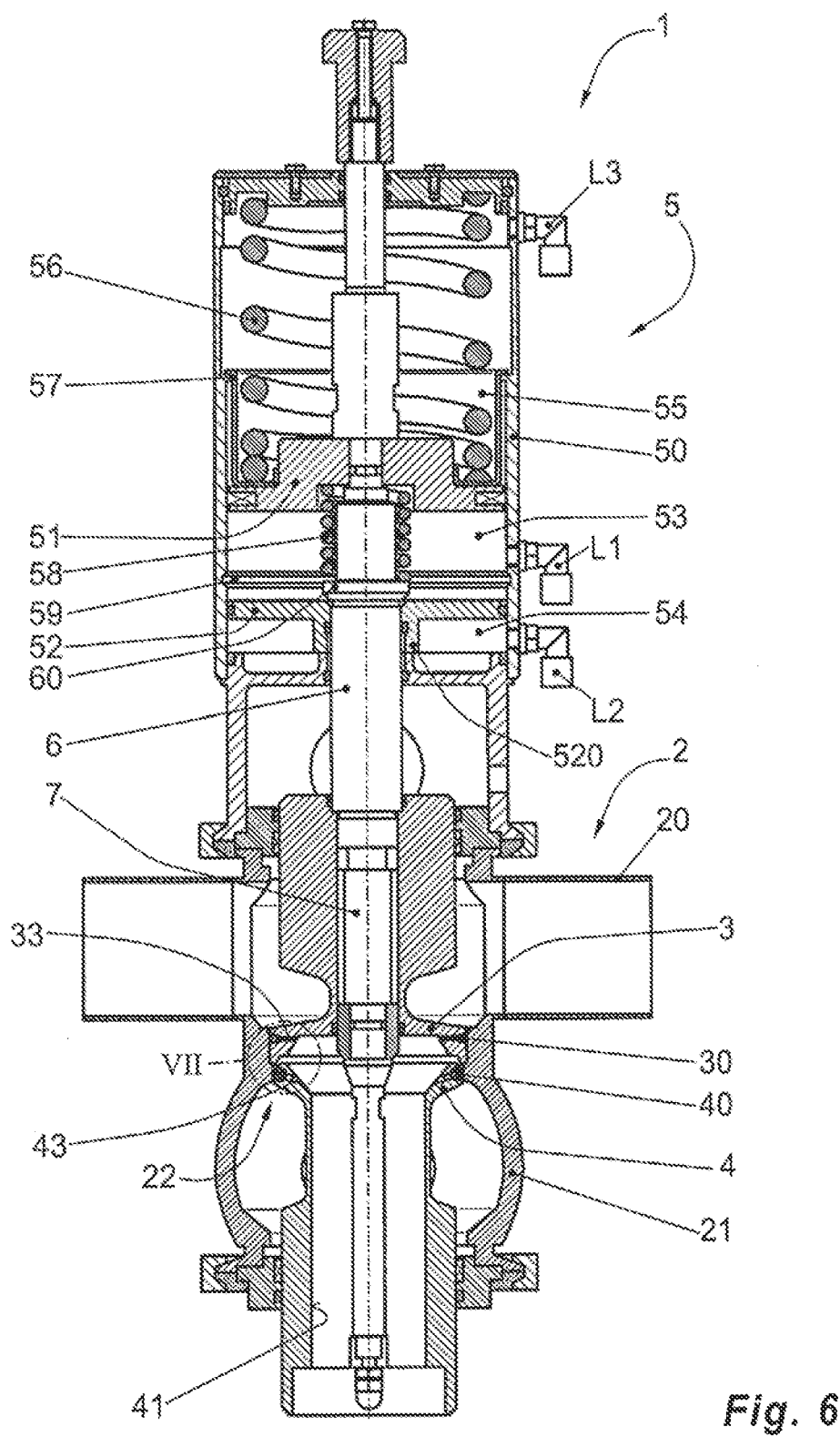
FIG. 6 schematically shows a second embodiment of a double-seat valve device shown in a cut-away view, and FIG. 7 schematically shows a detail VII according to FIG. 6 in a closed position of the double-seat valve device.

FIG. 6 shows a cross sectional view of second exemplary embodiment of a double-seat valve device 1. The double-seat valve device 1 according to FIG. 6 corresponds essentially to the double-seat valve device 1 according to FIG. 1, and consistent reference numbers are used for the same or similar components. A detailed description of components already described is thus omitted.

As is evident in FIG. 6, the first pressure chamber 53 is provided with a first compressed air port L1, the second pressure chamber 54 is provided with a second compressed air port L2, and the third pressure chamber 55 is provided with a third compressed air port L3.

In contrast to the embodiment according to FIG. 1, a traverse 72, which connects the inner shaft 7 to the second closing member 4, is arranged on one end of the second closing member 4 facing away from the first closing member 3.

Figure 7:
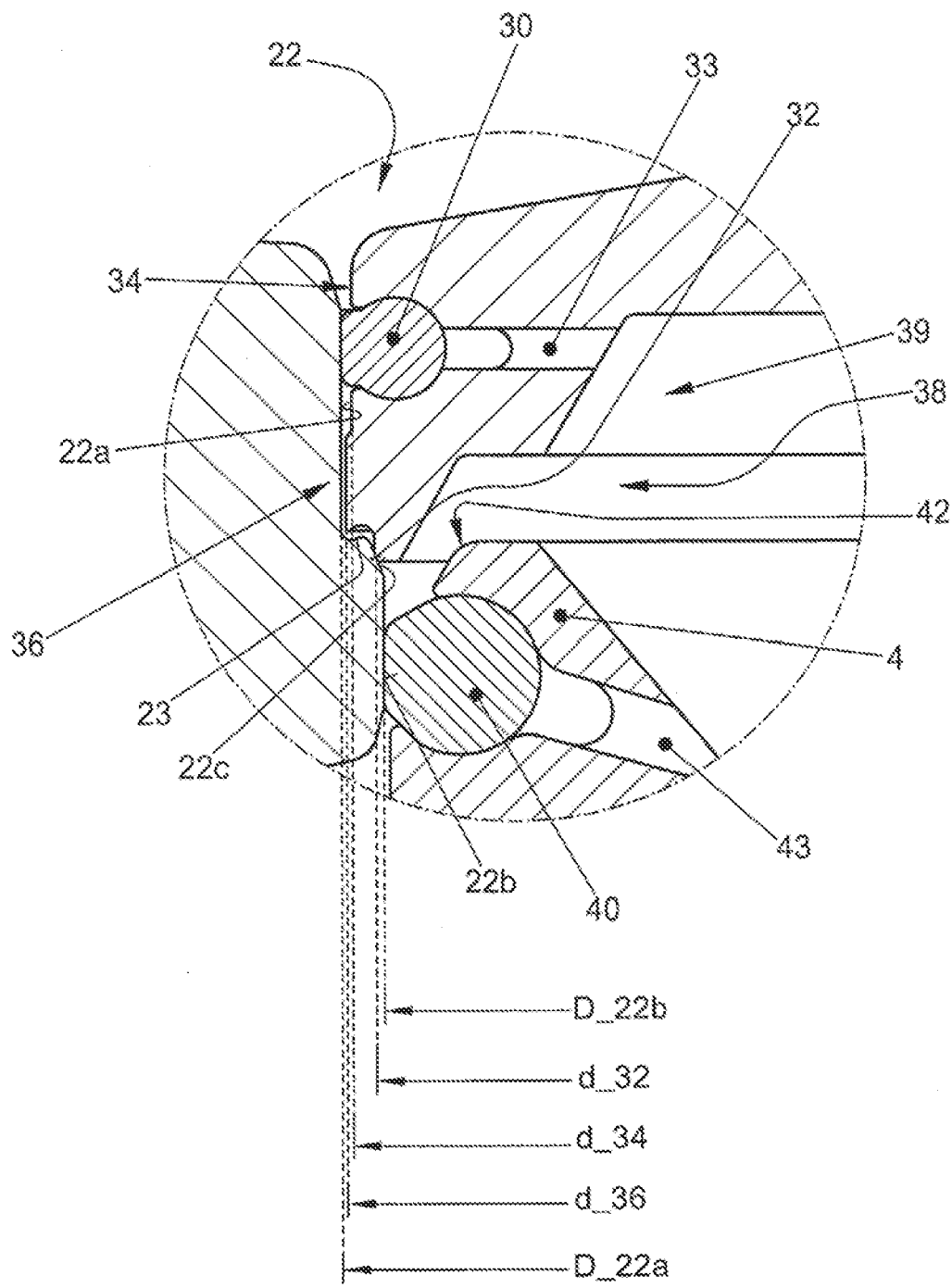

The exemplary embodiments differ further in the configuration of the valve seat region. FIG. 7 shows a detailed view VII of the valve seat region according to FIG. 6.

FIG. 7 shows a detail VII according to FIG. 6, wherein both closing members 3, 4 are located in a closed position as in FIG. 6. This state is also referred to as the closed position of the double-seat valve device 1. As shown in FIG. 7, a valve seat region with a first seat surface 22a, with a second seat surface 22b, with a third seat surface 22c, is provided at an inner surface of the connection opening 22. The first seat surface 22a is circular cylindrical Shaped with a first diameter $D\_22a$. The first sealing element 30 cooperates with the first seat surface 22a, as illustrated, for closing of the connection opening 22 to the first housing part 20 (see FIG. 6). The second seat surface 22b is likewise circular cylindrical-shaped with a second diameter $D\_22b$, wherein the second diameter $D\_22b$ of the second seat surface 22b is smaller than the diameter $D\_22a$ of the first seat surface 22a. The second seat surface 22b cooperates with the second sealing element 40 for closing of the connection opening 22 to the second housing part 21 (see FIG. 1). The sealing elements 30, 40 are each in a sliding contact with the seat surfaces 22a, 22b in order to cause a radial seal in the illustrated, closed position.

For increased reliability, a third conical seat surface 22c is provided which is arranged between the first seat surface 22a and the second seat surface 22b. The first closing member 3 is provided with a contact region 32, which rests against the third seat surface 22c in the illustrated closed position of the first closing member 3. An annular groove is provided between the first seat surface 22a and the third seat surface 22c, so that a concave curved deflecting surface 23 is formed. In the transition region between the first deflecting surface 23 and the third seat surface 22c there is an inflection point, and the concave curved deflecting surface 23 transforms into a convex curved transition region. Thus the deflecting surface 23 opens at an offset to the third seat surface 22c and a fluid flowing along the deflecting surface 23 will not be guided in the direction of the third seat surface 22c. A direction vector in one outlet edge of the deflecting surface 23 points in a direction away from the second sealing element 40, wherein the fluid jet deflected by the deflecting surface 23 does not have a velocity component directed perpendicularly onto the sealing element 40 bounding the flow.

The contact region 32 of the first closing member 3 is provided with a cylindrical-shaped outer surface, wherein a diameter d_32 of the contact region 32 is larger than a diameter D_22b of the second seat surface 22b. This reliably prevents the first closing member 3 from being displaced past the illustrated closing position in the direction of the second housing part 21.

A constraining force is applied via the first restoring spring 58 engaged with the annular collar 60 (cf. FIG. 6); said force forces the contact region 32 in the illustrated, closed position, into contact with the seat surface 22c, without additional supply of compressed air to the ports L1, L2, L3, so that a sealing effect is obtained owing to the solid-state contact between closing member 3 and seat surface 22c. Owing to the reliable seal, a cleaning and/or a sterilization is possible during the production, that is, while a product is present in at least one housing part 20, 21. A cleaning and/or sterilization fluid is discharged through the leakage opening 41 shown in FIG. 7. In the illustrated embodiment, cleaning channels 33, 43 are provided so that the sealing elements 30, 40 can be cleaned.

The first closing member 3 is provided with an accommodation section 34 with a circular cylindrical-shaped outer surface at which the first sealing element 30 is mounted, wherein a diameter d_34 of the accommodation section 34 is larger than a diameter of the contact region d_32. In addition, a throttle section 36 with a circular cylindrical-shaped outer surface is provided between the accommodation section 34 and the contact region 32, wherein a diameter d_36 of the throttle section 36 is larger than a diameter of the accommodation section d_34.

The second closing member 4 is provided at its end section 42 with a tapered or conical outer surface, at which the second sealing element 40 is mounted. At its front surface facing the second closing member 4, the first closing member 3 is provided with a recess 38 complementary to the end section 42 of the second closing element 4.

The operation of the double-seat valve device 1 according to FIGS. 6 and 7 corresponds to the operation of the double-seat valve device according to FIGS. 1 to 5.

The invention claimed is:

1. A double-seat valve device, comprising:
 a first closing member with a first sealing element and a contact region;
 a second closing member movable relative to the first closing member and having a second sealing element; and
 a valve housing with a first housing part and a second housing part and with a connection opening communicating the first housing part with the second housing part,
 wherein an inner surface of the connection opening is provided with a valve seat region, comprising:
  a first circular cylindrical-shaped seat surface with a first diameter, which together with the first sealing element forms a radial seal for closing of the connection opening to the first housing part;
  a second circular cylindrical-shaped seat surface with a second diameter, which together with the second sealing element forms a radial seal for closing of the connection opening to the second housing part, wherein the second diameter is smaller than the first diameter;
  a third seat surface which is arranged between the first seat surface and the second seat surface, wherein in a closed position of the first closing member the contact region of the first closing member rests against the third seat surface, so that the seat surface forms a solid-state stop for the contact region, and
  a deflecting surface, wherein
   the deflecting surface is arranged between the first seat surface and the third seat surface,
   the deflecting surface has an outlet edge which is offset to the third seat surface, and
   a direction vector at the outlet edge of the deflecting surface points in a direction away from the second sealing element.

2. The double seat valve device according to claim 1, wherein the deflecting surface is at least in one section concavely curved.

3. The double seat valve device according to claim 1, wherein the curvature of the deflecting surface in a transition section to the third seat surface has an inflection point and/or a point of discontinuity.

4. The double seat valve device according to claim 1, wherein the contact region of the first closing member which cooperates with the third seat surface is provided with a circular cylindrical-shaped outside surface, wherein a diameter of the contact region is larger than a diameter of the second seat surface.

5. The double seat valve device according to claim 1, wherein the contact region of the first closing member which cooperates with the third seat surface is arranged at a front surface of the first closing member.

6. The double seat valve device according to claim 5, wherein the first closing member is provided with a conical section adjoining to the front surface.

7. The double seat valve device according to claim 1, wherein the first closing member is provided with an accommodation section having a circular cylindrical-shaped outer surface and a throttle section arranged between the accommodating section and a front surface facing the second closing member, said throttle section having a circular cylindrical-shaped outer surface, wherein the first sealing element is mounted at the accommodating section, and a diameter of the throttle section is larger than a diameter of the accommodating section.

8. The double seat valve device according to claim 1, wherein the second closing member is provided with an end section having an outer surface against at which the second sealing element is mounted.

9. The double seat valve device according to claim 8, wherein the first closing member on a front surface facing the second closing member is provided with a recess complementary to the end section of the second closing member, said recess having an inner surface, wherein the end section is insertable into the recess so that said recess in any rotary position forms a sealing line with the outer surface of the end section.

10. The double seat valve device according to claim 1, wherein the second closing member is provided with a leakage cavity having a conical inlet opening facing the first closing member.

11. The double seat valve device according to claim 10, wherein the inlet opening extends up to the outer surface of the second closing member.

12. The double seat valve device according to claim 1, wherein a pneumatic valve drive is provided, having a pneumatic cylinder, a first and a second piston seated so as to be displaced in the pneumatic cylinder, an outer shaft which connects the first closing member to the first piston for a transfer of movement, and an inner shaft arranged concentrically to the outer shaft, which connects the second closing member to the second piston for a transfer of movement.

13. The double seat valve device according to claim 12, wherein a traverse is provided by means of which the inner shaft is connected to the second closing member for a transfer of movement.

14. The double seat valve device according to claim 13, wherein the traverse is provided with two webs.

15. The double seat valve device according to claim 13, wherein a distance between the traverse and one end of the second closing member facing the first closing member, is smaller than a distance between the traverse and one end of the second closing member facing away from the first closing member.

16. The double seat valve device according to claim 2, wherein the curvature of the deflecting surface in a transition section to the third seat surface has an inflection point and/or a point of discontinuity.

17. The double-seat valve device according to claim 1, wherein the first closing member forms an axial seal with the third seat surface.

* * * * *